United States Patent [19]

Momiyama et al.

[11] 4,257,678
[45] Mar. 24, 1981

[54] WIDE ANGLE PHOTOGRAPHIC LENS

[75] Inventors: Kikuo Momiyama; Hideo Yokota, both of Yokohama, Japan

[73] Assignee: Canon Kabushiki Kaisha, Tokyo, Japan

[21] Appl. No.: 941,171

[22] Filed: Sep. 11, 1978

[30] Foreign Application Priority Data

Sep. 14, 1977 [JP] Japan .................. 52-110940

[51] Int. Cl.³ .................................. G02B 9/60
[52] U.S. Cl. ......................................... 350/465
[58] Field of Search ............................. 350/216

[56] References Cited

U.S. PATENT DOCUMENTS

| | | | |
|---|---|---|---|
| 3,731,989 | 5/1973 | Shimizu | 350/216 |
| 3,936,153 | 2/1976 | Ogura | 350/216 |
| 4,130,349 | 12/1978 | Hyakumura | 350/216 |

FOREIGN PATENT DOCUMENTS

| | | | |
|---|---|---|---|
| 1062028 | 7/1959 | Fed. Rep. of Germany | 350/216 |
| 1187393 | 2/1965 | Fed. Rep. of Germany | 350/216 |

*Primary Examiner*—John K. Corbin
*Assistant Examiner*—Scott J. Sugarman
*Attorney, Agent, or Firm*—Toren, McGeady and Stanger

[57] ABSTRACT

An inverted-telephoto lens, particularly of a small size, is disclosed. A negative meniscus lens having a convex surface faces the object. This is followed by a positive lens consisting of a bi-convex lens cemented to a negative lens, a bi-concave lens, a positive meniscus lens having a convex surface directed toward the image and a positive lens having a highly convex lens facing the image. A diaphragm is located between the bi-convex lens and the bi-concave lens. To correct distortion and curvature of field, the negative meniscus lens is highly curved. The spherical aberration, the coma and the halo of the off-axial sagital rays subject to the above correction are corrected by means of the highly positive cemented surface of the positive biconvex cemented lens.

7 Claims, 15 Drawing Figures

-0.01   0.01         -0.01   0.01         -2      2(%)
SPHERICAL ABERRATION   ASTIGMATISM         DISTORTION

WIDE ANGLE PHOTOGRAPHIC LENS

BACKGROUND OF THE INVENTION

The present invention relates to a wide angle photographic lens, particularly to an inverted-telephoto or retrofocus photographic lens.

It is well known that the retrofocus lens was developed to provide a long back focus to small focal length lenses. In such lenses compensation of aberrations is difficult because of the asymmetrical arrangement of the divergent lens group at the object end of the convergent lens group. Correction of distortion, curvature of field and halo of the off-axial sagital rays is particularly difficult. The smaller the length of the lens, the more difficult is the compensation.

In a conventional retrofocus type lens, the number of the lenses is increased to overcome the difficulty of correcting aberrations. This, however, is undesirable because it raises manufacturing costs.

The inventors of the present invention have described retrofocus type lenses consisting of a small number of lenses German Patent Publications 1062028 and 1187393. An investigation has been made to decrease the total lens length to improve the aberrations and increase the picture angle and the back focus of a photographing lens, mentioned in the German Patent Publication 1187393, whose F-number is 1:2.8, picture angle $2\omega$ is 62°, back focus is 1.053f and lens length (the distance between the first surface and the last surface) is 1.274f.

SUMMARY OF THE INVENTION

A purpose of the present invention is to provide a compact lens while limiting the disadvantages of prior art lenses.

Another purpose of the present invention is to correct various aberrations, especially distortion, curvature of field or halo of the off-axial sagital rays.

Still another purpose of the present invention is to provide a lens with a long back focus suitable for an interchangeable lens for a single lens reflex camera.

The lens in accordance with the present invention comprises 5 groups of 6 lenses in which the first group is a negative meniscus lens having a convex surface toward the object, the second group is a positive lens consisting of a bi-convex lens and a negative lens cemented to each other, the third group is a bi-concave lens, the fourth lens is a positive meniscus lens having a convex surface for facing the object, the fifth group is a positive lens having a convex surface with a small radius of to be directed toward the object, a diaphragm is arranged between the second and the third group, and in which the following conditions prevail:

$$0.90f < L < 1.25f \quad (1)$$

$$1.5f < |f_1| < 2.2f \ (f_1 < 0) \quad (2)$$

$$0.20 < \frac{R_1 - R_2}{R_1 + R_2} < 0.31 \quad (3)$$

$$\frac{0.34}{f} < \frac{N_3 - N_2}{R_4} < \frac{0.50}{f} \quad (4)$$

$$\overline{N_v} > \overline{N_c} \text{ and } \overline{N_v} > 1.7 \quad (5)$$

wherein;

f: Focal length of the whole system
L: Total length (distance from the first surface to the last surface along the axis)
$f_1$: Focal length of the first group
$R_1$: Radius of curvature of the surface of the lens toward the object, of the first group
$R_2$: Radius of curvature of the surface of the lens toward the image, of the first group
$R_4$: Radius of curvature of the surface of the cemented lens of the second group
$N_2$: Refractive index of the material for the lens toward the object, of the second group
$N_3$: Refractive index of the material for the lens toward the image, of the second group
$\overline{N_v}$: Mean refractive index of the material for all of the positive lenses
$\overline{N_c}$: Mean refractive index of the material for all of the negative lenses

DESCRIPTION OF THE PREFERRED EMBODIMENT

Figure 1:
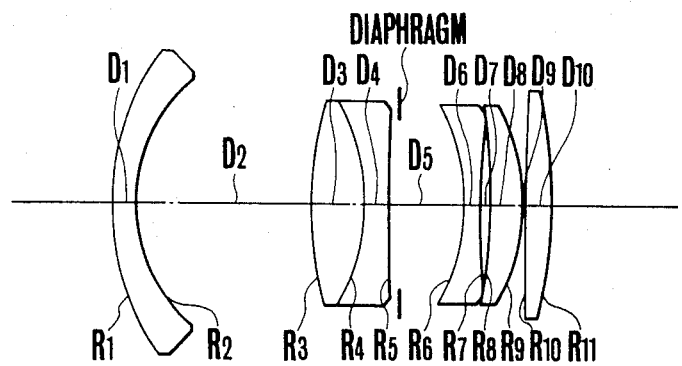
FIG. 1 shows a section of a first example of a lens embodying the invention.

The first of the aforementioned prevailing conditions (0.90f < L < 1.25f) refers to the total length of the lens. Here when L is larger than the upper limit (L > 1.25f) the total length can not be said to be shortened. When L is smaller than the lower limit (L < 0.90f), the correction of aberrations becomes difficult, so that it is hard to produce a lens with which a superior picture quality can be obtained.

When the total length has been selected in accordance with the first condition, it is essential that the first group be chosen with a high refractive power in comparison with the conventional lens of this type in order to obtain a sufficient back focus.

The second condition (1.5f < |$f_1$| < 2.2f) refers to the long back focus. Here when |$f_1$| is larger than the upper limit (|$f_1$| > 2.2f), the ultimate purpose can not be realized. When |$f_1$| is smaller than the lower limit (|$f_1$| < 1.5f), this means an increase of the refractive power. Hereby, if the refractive power is increased excessively, the superior correction of the aberration becomes difficult even when the condition to be explained later is satisfied.

On the other hand, when the total length as well as the refractive power of the first group are chosen within the above mentioned range, the aberration correction by means of a conventional lens arrangement is generally difficult. In accordance with the the present invention, this difficulty is overcome by giving a strong meniscus shape to the first group in comparison with such a first group in a conventional wide angle lens, and forming the cemented surface in the second group as a strong positive refractive surface.

The third condition $(0.20 < (R_1 - R_2)/(R_1 + R_2) < 0.31)$ refers to the satisfactory correction of the distortion as well as the curvature of field by according to a strong meniscus shape to the first group, whereby when $(R_1 - R_2)/(R_1 + R_2)$ is larger than the upper limit (0.31), the distortion as well as the field curvature can not be corrected satisfactorily. When on the other hand, $(R_1 - R_2)/(R_1 + R_2)$ is smaller than the lower limit (0.20), the positive spherical aberration, the negative coma and the halo due to the off-axial sagital beam taking place in the first group are increased beyond the correction of the lens group arranged closer to the image side than the second group.

At this time generally, the spherical aberration is over-corrected, the coma under-corrected and the off-axial sagital beam over-corrected when the radius of curvature of the first group is chosen within the aforementioned ranges.

The fourth condition serves effectively to correct the aforementioned aberrations due to the above third condition by forming the cemented surface of the second group as a strongly positive refractive surface. When $(N_3 - N_2)/R_4$ in the condition $0.34/f < (N_3 - N_2)/R_4 < 0.50/f$ is smaller than the lower limit (0.34/f), the correction of the above mentioned aberrations is difficult. When $(N_3 - N_2)/R_4$ is larger than the upper limit (0.50/f) the spherical aberration of higher degree, the coma of higher degree and so on taking place at the cemented surface are increased. This is undesirable.

The fifth condition serves to decrease the arch in the middle part of the aberration diagram of the curvature of field due to the decreased total length. When the condition $\overline{Nv} > \overline{Nc}$, $\overline{Nv} > 1.7$ is not satisfied, the Petzval sum becomes large, which makes it difficult to correct the central arch.

Figure 3:
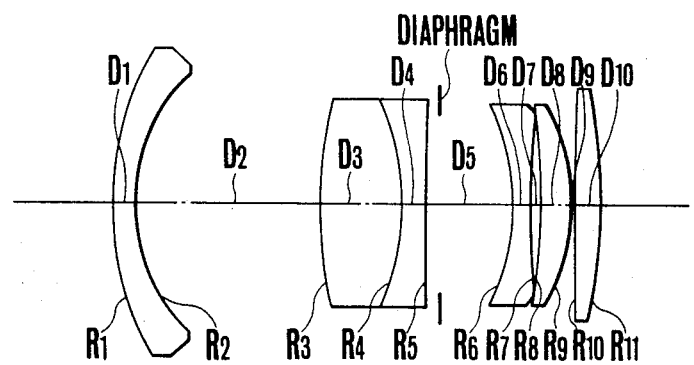
FIG. 3 shows a section of a second example of a lens embodying the invention.
Figure 5:
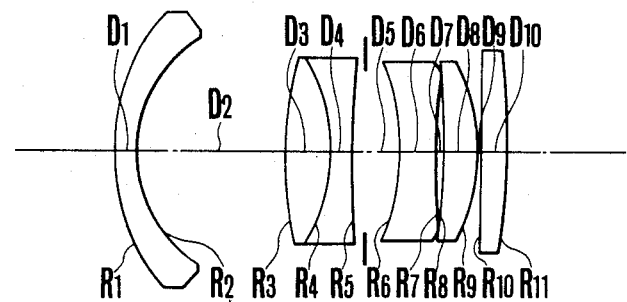
FIG. 5 shows a section of a third example of a lens embodying the invention.
Figures 2A, 2B, 2C:
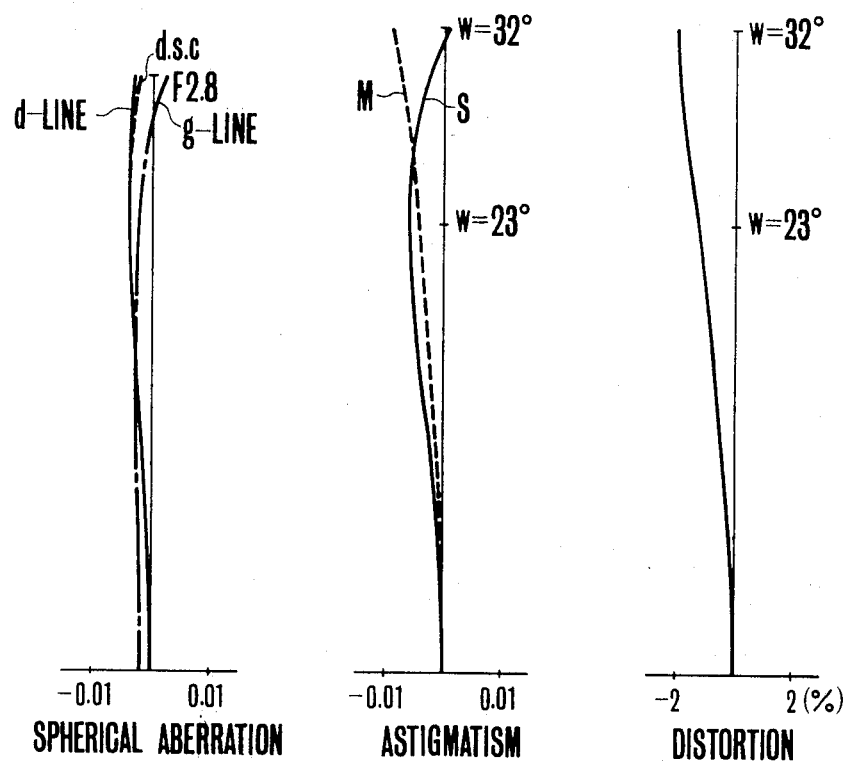
FIGS. 2A-2C show longitudinal aberration diagrams of the first example.
Figure 2D:
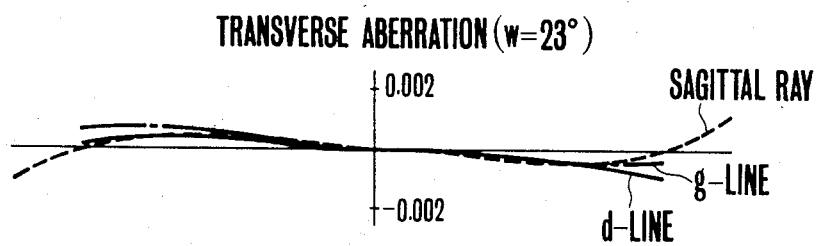
FIG. 2D shows lateral aberration diagram of the first example.
Figures 4A, 4B, 4C:
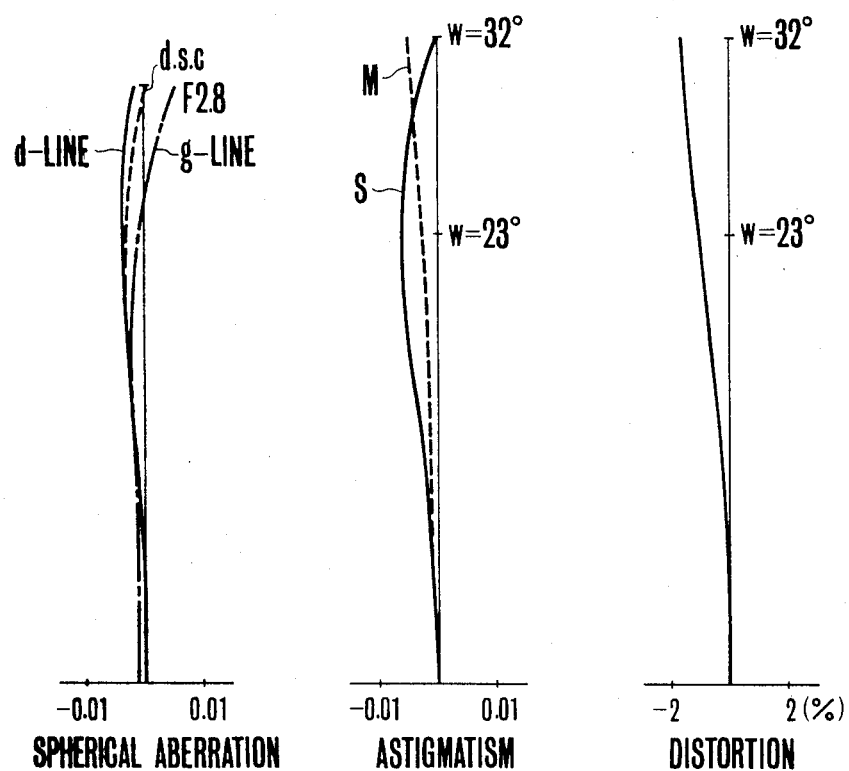
FIGS. 4A-4C show longitudinal aberration diagrams of the second example.
Figure 4D:
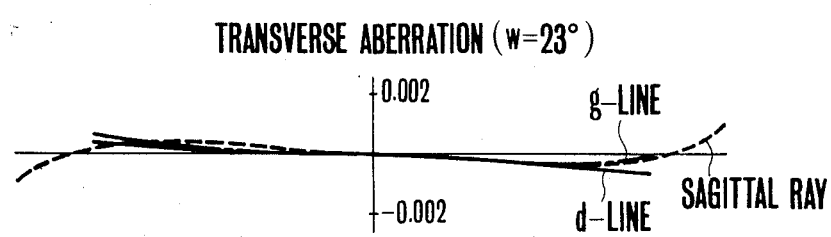
FIG. 4D shows lateral aberration diagram of the second example.
Figures 6A, 6B, 6C:
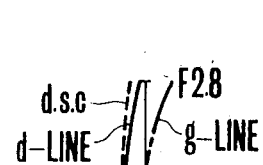
FIGS. 6A-6C show longitudinal aberration diagrams of the third example.
Figure 6D:
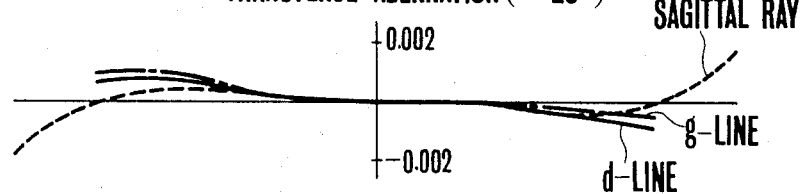

FIG. 1 shows a first example which satisfies the aforementioned conditions. FIGS. 2A–2D respectively show the spherical aberration, the astigmatism, the distortion and the lateral aberration of the embodiment in FIG. 1. FIGS. 3 and 5 respectively show the second and the third examples, while FIGS. 4A–4D and FIGS. 6A–6D show the respective aberrations. In FIGS. 2B, 4B and 6B, S is the sagital astigmatic line while M is the meridional astigmatic line.

EXAMPLE 1

| f = 1 | F/2.8 | 2ω = 64° | b.f = 1.1033 | |
|---|---|---|---|---|
| No. | R | D | Nd | Vd |
| 1 | 0.6056 | 0.0507 | 1.51633 | 64.1 |
| 2 | 0.3534 | 0.4314 | | |
| 3 | 0.9877 | 0.1181 | 1.8061 | 40.9 |
| 4 | −0.4909 | 0.0620 | 1.60342 | 38.0 |
| 5 | 4.0782 | 0.1857 | | |
| 6 | −0.5410 | 0.0428 | 1.74077 | 27.8 |
| 7 | 2.2224 | 0.0225 | | |
| 8 | −1.7714 | 0.0796 | 1.6935 | 53.3 |
| 9 | −0.4768 | 0.0042 | | |
| 10 | 6.4449 | 0.0676 | 1.6935 | 53.3 |
| 11 | −1.1735 | | | |

$\Sigma D = 1.0646 \ (= L/f)$ $f_1 = -1.7643f \quad \frac{N_3 - N_2}{R_4} = \frac{0.4128}{f}$ $\frac{R_1 - R_2}{R_1 + R_2} = 0.2630 \quad \overline{Nv} = 1.7310$

| | Aberration of Example 1 | | | | |
|---|---|---|---|---|---|
| No. | I | II | III | P | V |
| 1 | 1.011660 | 0.112329 | 0.012472 | 0.562382 | 0.063829 |
| 2 | −10.020367 | 1.499647 | −0.224437 | −0.963721 | 0.177820 |
| 3 | 2.742492 | 0.993804 | 0.360127 | 0.451966 | 0.294280 |
| 4 | 6.179866 | −1.391036 | 0.313110 | 0.142598 | −0.102576 |
| 5 | 0.096242 | −0.182361 | 0.345538 | −0.092297 | −0.479844 |
| 6 | −6.675520 | 1.594289 | −0.380758 | −0.786735 | 0.278828 |
| 7 | −1.677963 | −1.393091 | −1.156582 | −0.191515 | −1.119227 |
| 8 | 0.080916 | 0.210579 | 0.548017 | −0.231222 | 0.824437 |
| 9 | 5.295434 | −0.667528 | 0.084147 | 0.859031 | −0.118895 |
| 10 | −0.000351 | 0.005702 | −0.092654 | 0.063552 | 0.472858 |
| 11 | 3.649237 | −0.765887 | 0.160741 | 0.349030 | −0.106989 |
| Σ | 0.681647 | 0.016448 | −0.030277 | 0.163069 | 0.184521 |

I: Spherical aberration
II: Coma
III: Astigmatism
P: Petzval sum
V: Distortion

EXAMPLE 2

| f = 1 | F/2.8 | 2ω = 64° | b.f = 1.1246 | |
|---|---|---|---|---|
| No. | R | D | Nd | Vd |
| 1 | 0.7606 | 0.0507 | 1.58313 | 59.4 |
| 2 | 0.4085 | 0.4414 | | |
| 3 | 1.0123 | 0.2048 | 1.8061 | 40.9 |
| 4 | −0.5400 | 0.0563 | 1.61293 | 37. |
| 5 | 8.9289 | 0.2140 | | |
| 6 | −0.5269 | 0.0421 | 1.7552 | 27.5 |
| 7 | 2.7839 | 0.0225 | | |
| 8 | −1.7639 | 0.0800 | 1.6935 | 53.2 |
| 9 | −0.4769 | 0.0042 | | |
| 10 | 8.6391 | 0.0676 | 1.7725 | 49.6 |
| 11 | −1.2443 | | | |

$\Sigma D = 1.1836 \ (= L/f)$ $f_1 = -1.5980f \quad \frac{N_3 - N_2}{R_4} = \frac{0.3577}{f}$ $\frac{R_1 - R_2}{R_1 + R_2} = 0.3012 \quad \overline{Nv} = 1.7574$

| | Aberration of Example 2 | | | | |
|---|---|---|---|---|---|
| No. | I | II | III | P | V |
| 1 | 0.528842 | 0.130281 | 0.032095 | 0.484299 | 0.127214 |
| 2 | −8.257174 | 1.166295 | −0.164735 | −0.901798 | 0.150644 |

-continued

Aberration of Example 2

| No. | I | II | III | P | V |
|---|---|---|---|---|---|
| 3 | 3.210762 | 0.992494 | 0.306794 | 0.440877 | 0.231116 |
| 4 | 4.606003 | −1.069221 | 0.248205 | 0.122797 | −0.086123 |
| 5 | 0.170149 | −0.247523 | 0.360084 | −0.042559 | −0.461918 |
| 6 | −7.079107 | 1.477163 | −0.308276 | −0.816523 | 0.234740 |
| 7 | −1.636783 | −1.403723 | −1.203849 | −0.154552 | −1.164980 |
| 8 | 0.102679 | 0.245284 | 0.585945 | −0.232157 | 0.845146 |
| 9 | 5.366247 | −0.553558 | 0.057103 | 0.858628 | −0.094463 |
| 10 | −0.000559 | 0.007023 | −0.088272 | 0.050448 | 0.475391 |
| 11 | 3.684435 | −0.724842 | 0.142599 | 0.350266 | −0.096962 |
| Σ | 0.696494 | 0.019673 | −0.032306 | 0.159724 | 0.159805 |

EXAMPLE 3

| | $f = 1$ | F/2.8 | $2\omega = 64°$ | b.f = 1.0522 | |
|---|---|---|---|---|---|
| No. | R | D | | Nd | Vd |
| 1 | 0.4858 | 0.0507 | | 1.48749 | 70.1 |
| 2 | 0.3116 | 0.3595 | | | |
| 3 | 0.8666 | 0.1153 | | 1.8061 | 40.9 |
| 4 | −0.4479 | 0.0563 | | 1.59551 | 39.2 |
| 5 | 3.5840 | 0.1043 | | | |
| 6 | −0.6011 | 0.0918 | | 1.7847 | 26.2 |
| 7 | 1.5842 | 0.0225 | | | |
| 8 | −2.4692 | 0.0800 | | 1.7725 | 49.6 |
| 9 | −0.4950 | 0.0042 | | | |
| 10 | −40.2080 | 0.0676 | | 1.7725 | 49.6 |
| 11 | −1.5202 | | | | |

$\Sigma D = 0.9522 \ (= L/f)$ $f_1 = -1.9713f \quad \dfrac{N_3 - N_2}{R_4} = \dfrac{0.4702}{f}$ $\dfrac{R_1 - R_2}{R_1 + R_2} = 0.2184 \quad \overline{Nv} = 1.7838$

What is claimed is:

1. A wide angle photographing lens comprising:
first lens means being a negative meniscus lens with a convex surface to be directed toward the object;
second lens means having a positive doublet consisting of a bi-convex lens and a negative lens cemented to each other;
third lens means having a bi-concave lens arranged at the object end of the second lens means;
fourth lens means having a positive meniscus lens with a convex surface toward the image and arranged at the image end of the third lens means;
fifth lens means having a positive lens the absolute value of whose radius of curvature of lens surface at the object end is larger than that at the image end and arranged at the image end of the fourth lens means;
a diaphragm between the second lens means and the third lens means,
the lens and lens means satisfying the conditions:

$0.9522f \leq L \leq 1.1836f$ $1.5980f \leq |f_1| \leq 1.9713f \quad (f_1 < 0)$ $0.2184 \leq \dfrac{R_1 - R_2}{R_1 + R_2} \leq 0.3012$ $\dfrac{0.3577}{f} \leq \dfrac{N_3 - N_2}{R_4} \leq \dfrac{0.4702}{f}$ wherein
f: Focal length of the total system
L: Distance between the first lens surface and the last lens surface along the axis
$f_1$: Focal length of the first lens
$R_1$: Radius of curvature of the surface at the object side of the first lens
$R_2$: Radius of curvature of the surface of at the image side of the first lens means
$R_4$: Radius of curvature of the cemented surface of the second lens means
$N_2$: Refractive index of the bi-convex lens of the second lens means
$N_3$: Refractive index of the negative lens of the second lens means.

2. A wide angle photographing lens in accordance with claim 1 further satisfying the conditions $\overline{Nv} > \overline{Nc}$ and $\overline{Nv} > 1.7$ wherein
$\overline{Nv}$: Mean refractive index of all of the positive lenses in the wide angle photographing lens
$\overline{Nc}$: Mean refractive index of all of the negative lenses.

3. A wide angle photographing lens in accordance with claim 2, wherein $1.7310 < \overline{Nv} < 1.7838$ 4. A wide angle photographing lens in accordance with claim 1, wherein the last surface of the second lens means has a concave surface to be directed toward the image and the first surface of the fifth lens means has a convex surface to be directed toward the object.

5. A lens as in claim 3, having the following numerical data:

| | $f = 1$ | F/2.8 | $2\omega = 64°$ | b.f = 1.1033 | |
|---|---|---|---|---|---|
| No. | R | D | | Nd | Vd |
| 1 | 0.6056 | 0.0507 | | 1.51633 | 64.1 |
| 2 | 0.3534 | 0.4314 | | | |
| 3 | 0.9877 | 0.1181 | | 1.8061 | 40.9 |
| 4 | −0.4909 | 0.0620 | | 1.60342 | 38.0 |
| 5 | 4.0782 | 0.1857 | | | |
| 6 | −0.5410 | 0.0428 | | 1.74077 | 27.8 |
| 7 | 2.2224 | 0.0225 | | | |
| 8 | −1.7714 | 0.0796 | | 1.6935 | 53.3 |
| 9 | −0.4768 | 0.0042 | | | |
| 10 | 6.4449 | 0.0676 | | 1.6935 | 53.3 |
| 11 | −1.1735 | | | | |

$\Sigma D = 1.0646 \ (= L/f)$ wherein R represents the radius of curvature of each of successive lens surfaces No. 1, 2, . . . lenses, D represents the center distance between each of successive lens surfaces, Nd represents the index of refraction of each of successive lenses, Vd represents Abbe's number for each of successive lenses, $2\omega$ represents the field of view, and b.f represents the back focus.

6. A lens as in claim 3, having the following numerical data:

| | f = 1 F/2.8 2ω = 64° b.f = 1.1246 | | | |
|---|---|---|---|---|
| No. | R | D | Nd | Vd |
| 1 | 0.7606 | 0.0507 | 1.58313 | 59.4 |
| 2 | 0.4085 | 0.4414 | | |
| 3 | 1.0123 | 0.2048 | 1.8061 | 40.9 |
| 4 | −0.5400 | 0.0563 | 1.61293 | 37. |
| 5 | 8.9289 | 0.2140 | | |
| 6 | −0.5269 | 0.0421 | 1.7552 | 27.5 |
| 7 | 2.7839 | 0.0225 | | |
| 8 | −1.7639 | 0.0800 | 1.6935 | 53.2 |
| 9 | −0.4769 | 0.0042 | | |
| 10 | 8.6391 | 0.0676 | 1.7725 | 49.6 |
| 11 | −1.2443 | | | |

ΣD = 1.1836 (= L/f)

wherein R represents the radius of curvature of each of successive lens surfaces No. 1, 2, . . . lenses, D represents the center distance between each of successive lens surfaces, Nd represents the index of refraction of each of successive lenses, Vd represents Abbe's number for each of successive lenses, $2\omega$ represents the field of view, and b.f represents the back focus.

7. A lens as in claim 3, having the following numerical data:

| | f = 1 F/2.8 2ω = 64° b.f = 1.0522 | | | |
|---|---|---|---|---|
| No. | R | D | Nd | Vd |
| 1 | 0.4858 | 0.0507 | 1.48749 | 70.1 |
| 2 | 0.3116 | 0.3595 | | |
| 3 | 0.8666 | 0.1153 | 1.8061 | 40.9 |
| 4 | −0.4479 | 0.0563 | 1.59551 | 39.2 |
| 5 | 3.5840 | 0.1043 | | |
| 6 | −0.6011 | 0.0918 | 1.7847 | 26.2 |
| 7 | 1.5842 | 0.0225 | | |
| 8 | −2.4692 | 0.0800 | 1.7725 | 49.6 |
| 9 | −0.4950 | 0.0042 | | |
| 10 | −40.2080 | 0.0676 | 1.7725 | 49.6 |
| 11 | −1.5202 | | | |

ΣD = 0.9522 (= L/f)

wherein R represents the radius of curvature of each of successive lens surfaces No. 1, 2, . . . lenses, D represents the center distance between each of successive lens surfaces, Nd represents the index of refraction of each of successive lenses, Vd represents Abbe's number for each of successive lenses, $2\omega$ represents the field of view and b.f represents the back focus.

* * * * *